(12) United States Patent
Hartung et al.

(10) Patent No.: US 8,914,822 B2
(45) Date of Patent: Dec. 16, 2014

(54) PLAY-OUT CONTROL FOR A MEDIA DATA STREAM

(75) Inventors: Frank Hartung, Herzogenrath (DE);
Daniel Catrein, Herzogenrath (DE);
Thorsten Lohmar, Aachen (DE);
Thomas Rusert, Kista (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 13 days.

(21) Appl. No.: 13/032,888

(22) Filed: Feb. 23, 2011

(65) Prior Publication Data

US 2011/0231870 A1    Sep. 22, 2011

Related U.S. Application Data

(60) Provisional application No. 61/307,570, filed on Feb. 24, 2010.

(30) Foreign Application Priority Data

Feb. 18, 2011 (WO) .................. PCT/EP2011/052439

(51) Int. Cl.
*H04N 21/462*    (2011.01)
*H04N 21/845*    (2011.01)
*H04N 21/434*    (2011.01)
*H04N 21/4623*   (2011.01)
*H04L 29/06*     (2006.01)

(52) U.S. Cl.
CPC ............ *H04L 65/607* (2013.01); *H04L 65/601* (2013.01); *H04N 21/8455* (2013.01); *H04N 21/4345* (2013.01); *H04N 21/462* (2013.01); *H04N 21/4623* (2013.01); *H04L 65/4076* (2013.01)
USPC ............................................. 725/25; 725/28

(58) Field of Classification Search
USPC ................................................. 725/25, 28, 31
See application file for complete search history.

(56) References Cited

U.S. PATENT DOCUMENTS

| 5,420,866 | A | * | 5/1995 | Wasilewski ................... 370/426 |
| 2004/0028228 | A1 | * | 2/2004 | Hamada et al. ............... 380/201 |
| 2005/0073579 | A1 | * | 4/2005 | Lepine et al. ................. 348/100 |
| 2006/0287956 | A1 | * | 12/2006 | Higashi et al. ................. 705/51 |
| 2010/0169172 | A1 | * | 7/2010 | Sergey et al. .............. 705/14.39 |

FOREIGN PATENT DOCUMENTS

WO    2009014733 A1    1/2009

OTHER PUBLICATIONS

Marlin Development Community, "Marlin Dynamic Media Zones Version 1.0", Jan. 25, 2008, XP002630071.

* cited by examiner

*Primary Examiner* — Jefferey Harold
*Assistant Examiner* — Justin Sanders
(74) *Attorney, Agent, or Firm* — Coats & Bennett, PLLC

(57) ABSTRACT

A technique for controlling a play-out of a media data stream at a receiving device is provided. The media data stream comprises one or more programs, and each program comprises one or more program components. In a method implementation of the technique, a zone description is defined. The zone description is defined for a media zone for at least one program or at least one program component in the media stream and identifies the media zone for the at least one program or the at least one program component. In a next step, the zone description is associated to a program specific information data segment. The program specific information data segment is part of the media stream and comprises data specifying information at least regarding to the at least one program or at least one program component. The method also comprises transmitting the media data stream towards the receiving device.

36 Claims, 6 Drawing Sheets

PLAY-OUT CONTROL FOR A MEDIA DATA STREAM

RELATED APPLICATIONS

This application claims priority to U.S. Provisional Patent Application No. 61/307,570, filed Feb. 24, 2010, and International Patent Application No. PCT/EP2011/052439, filed Feb. 18, 2011, both of which are incorporated by reference herein in their entireties.

TECHNICAL FIELD

The present disclosure generally relates to methods, devices and a computer program product for controlling play out of a media data stream. The media data stream comprises one or more programs.

BACKGROUND

Forced play-out is a functionality that can, for example, be used to control that a user can not skip certain advertising parts when watching a video clip, or other content. By ensuring this advertisers may be willing to subsidize the cost of the content access.

The Open IPTV Forum standardization (OIPF) is, for example, putting requirements on this type of functionality. In this regard, reference is made to Open IPTV Forum, "Functional Architecture V2.0", http://www.openiptvforum.org/docs/OIPF-Functional_Architecture_v2_0-2009-09-08.pdf.

To fulfill these requirements, the Marlin Developer Community (MDC), which develops one of the content protection solutions that are recommended by OIPF, has created an extension to Marlin that is called the Dynamic Media Zones (DMZ) specification (http://www.marlin-community.com; see "Marlin Dynamic Media Zones", Version 1.0, Final, Marlin Developer Community, 25 Jan. 2008 —reference [1] hereinafter—and Version 1.0.1, Final, Marlin Developer Community, 13 Nov. 2009). OIPF is considering adopting a solution for forced play-out control that is based on Marlin DMZ. It requires however a solution that is also applicable to unprotected content (http://member.oipf.tv/Application/documetapp/downloadimmediate/default.aspx?docID=3410; see Open IPTV Forum, "OIPF-IPP-SOL-107-Navigation_Constraints_in_OIPF"—reference [2] hereinafter), and to Moving Pictures Expert Group-2 (MPEG-2) Transport Streams (TS), besides MP4 files.

The Marlin DMZ solution does not provide mapping to MPEG-2 TSs. In the November 2009 meeting, a proposal was made how to carry DMZ information in MPEG-2 TS streams (see marlin-DynamicMediaZonesSpecification-v1.1_20091102.doc, non-public submission to November 2009 MDC meeting, from Sye Loong Keoh, Philips,—reference [4] hereinafter). The proposal was not adopted and is not usable for unprotected content, as it carries the DMZ information in Entitlement Control Messages (ECMs), i.e. key messages that are only used for protected content. No other proposal is hitherto known that suggests a feasible solution to the problem of signaling DMZ information in MPEG-2 or other TSs so that the solution is usable for both protected/encrypted and unprotected/unencrypted content.

In addition, there are other weaknesses of the previous proposal (e.g., regarding precise start and end point marking of the zones).

SUMMARY

There is a need for a technique that permits media zone-related signaling in MPEG-2 or other media data streams.

According to a first aspect, a method for controlling a play-out of a media data stream at a receiving device is provided, the media data stream comprising one or more programs and each program comprising one or more program components. The method comprises defining a zone description for a media zone for at least one program of said one or more programs or at least one program component of said one or more program components in the media data stream, the zone description identifying the media zone for said at least one program or said at least one program component in the media stream; associating the zone description to a program specific information data segment, the program specific information data segment being a part of the media data stream and comprising data specifying information at least regarding to said at least one program or said at least one program component; and transmitting the media data stream towards the receiving device.

Defining a zone description may, for example, comprise creating a new or updating a zone description. Moreover, associating the zone description to a program specific information data segment may, for example, be performed by inserting or including the zone description in this data segment. The program specific information data segment may be any MPEG-2 table.

The method may further comprise determining an identifier for identifying the media zone in the media stream, and inserting the identifier into the zone description. The identifier may be a Zone Identifier.

The method may also comprise determining at least one further element of a group of further elements comprising
- further identification information for identifying start, end or duration of the media zone in the media data stream (e.g., Zone Start, Zone End or Zone Duration, etc.),
- a play-out control instruction (e.g., information indicating usage permissions and/or restrictions) regarding the play-out of the media zone (e.g., Zone Properties),
- information for inserting media data into the media zone (e.g., External Zone Reference),
- rights management information regarding the media zone (e.g., Digital Rights Management, or DRM, system information, DRM content ID, and/or DRM Rights Issuer Universal Resource Locator, or RI URL), and
- integrity protection information for protecting the integrity of at least one of the media zone and the zone description or parts thereof (e.g., a Signature Key ID, Signature Algorithm, and/or Signature Value), and inserting the at least one further element into the zone description or a zone descriptor comprising the zone description.

The play-out control instruction may convey zone type information in accordance with the Marlin Dynamic Media Zones specification. The play-out control instruction may be part of the zone description, but it is not a must. For example, for systems of sending and remote receiving devices for which only a single play-out control instruction for media zones exists, this single play-out control instruction does not necessarily need to be stated in the zone description because the remote receiving device can be configured to apply, when detecting a media zone (e.g., by analyzing the zone description), the only (single) play-out control instruction known in the system as, for example, retrieved from a data storage of the remote receiving device.

The method may further comprise determining the protection integrity information regarding the zone description. Determining the protection integrity information may comprise performing a cryptographic signature over the zone description to obtain a signature value. The cryptographic signature may be performed using a cryptographic key delivered in an Entitlement Control Message, or ECM, or a cryptographic key derived therefrom. The cryptographic key may be the key used to protect the media stream.

The method may also comprise determining that at least one of said one or more program components is protected, setting a zone indication parameter in accordance with the protection determination, and associating (e.g., inserting or including) the zone indication parameter to a data segment preventing unauthorized play-out of at least one of said one or more program elements, said data segment being part of the media data stream. An integrity protection of the zone indication parameter may be performed. The data segment preventing unauthorized play-out may be an ECM. The zone indication parameter may be a zone information notification flag or a zone descriptor counter.

The method may further comprise triggering the definition of the program specific information data segment whenever an update of the zone description occurs.

According to another aspect, a method for controlling a play-out of a media data stream at a receiving device is provided, the media data stream comprising one or more programs and each program comprising one or more program components. The method comprises receiving the media data stream comprising a program specific information data segment, the program specific information data segment having associated a zone description for a media zone defined for at least one program of said one or more programs or at least one program component of said one or more program components, the program specific information data segment further comprising data specifying information at least regarding said at least one program or said at least one program component, the zone description identifying the media zone for said at least one program or said at least one program component in the media stream; detecting in the media data stream the program specific information data segment comprising the zone description; based upon an analysis of the zone description, identifying the media zone and determining a play-out control instruction for the play-out of the media zone; and playing-out the identified media zone according to the determined play-out control instruction.

In one implementation already discussed above (single play-out control instruction), upon detecting the zone description, the receiving device may conclude from the pure presence of the zone to apply the only possible play-out control instruction defined in the system such that no explicit instruction command may be specified in the zone description. However, the explicit specification may be the more frequent and more likely case.

The program specific information data segment may be any MPEG-2 table. Moreover, the media zone my be identified from an identifier in the zone description.

The method performed at the receiving device may further comprise determining from the zone description at least one further element of a group of further elements comprising
- further identification information for identifying start, end or duration of the media zone in the media data stream (e.g., Zone Start, Zone End or Zone Duration, etc.),
- a play-out control instruction (e.g., information indicating usage permissions and/or restrictions) regarding the play-out of the media zone (e.g., Zone Properties),
- information for inserting media data into the media zone (e.g., External Zone Reference),
- rights management information regarding the media zone (e.g., DRM system information, DRM content ID, and/or DRM Rights Issuer Universal Resource Locator, or RI URL), and
- integrity protection information for protecting the integrity of at least one of the media zone and the zone description or parts thereof (e.g., a Signature Key ID, Signature Algorithm, and/or Signature Value).

Based on the determined further element at least one operation may be performed from a group of operations comprising
- identifying start, end or duration of the media zone in the media data stream based on the further identification information,
- performing the play-out of the media zone according to the play-out control instruction determined from the zone description,
- determining media data that is in accordance with the information for inserting media data into the media zone and inserting said media data into the media zone,
- determining rights management data and operations from the rights management information and applying the determined rights management data and operations to the media zone, and
- verifying the integrity protection information for verifying the integrity of at least one of the media zone and the zone description or parts thereof.

The method performed at the receiving device may also comprise determining the integrity protection information regarding the zone description. Moreover, the method performed at the receiving device may further comprise receiving an ECM. The ECM may contain a cryptographic key, and the integrity protection information may be a signature value obtained by performing a cryptographic signature over the zone description using the cryptographic key.

The method performed at the receiving device may further comprise the steps of detecting in the media stream a zone indication parameter associated to a data segment preventing unauthorized play-out of at least one of said one or more programs or said one or more program elements, and performing a security operation regarding at least one of said one or more programs, said one or more program elements, the media zone, and the zone description. Additionally, an integrity protection verification procedure of the zone indication parameter may be performed.

The data segment preventing unauthorized play-out may be an ECM, and the zone indication parameter may be a zone information notification flag or a zone descriptor counter. In such a case the method performed at the receiving device may further comprise receiving the zone information notification flag in the ECM, the zone information notification flag signaling that the program specific information data segment contains a zone description. The program specific information data segment may be examined to determine if the zone information notification flag is set.

The method performed at the receiving device may also comprise verifying the integrity protection information based on a cryptographic key received in the ECM. The cryptographic key may be the key used to protect the media stream.

The method performed at the receiving device may further comprise performing, whenever an update of the program specific information data segment is detected, the detection of the media zone and the determination of the play-out control instruction.

The present disclosure also concerns computer programs comprising portions of software codes in order to implement any of the methods as described herein when operated at a sending or receiving device. The computer programs can be stored on computer readable media. A computer-readable medium can be a permanent or rewritable memory within a sending or receiving device or located externally. The computer program can be also transferred to the respective devices for example via a cable or a wireless link as a sequence of signals. Thus, a computer program is provided comprising code adapted to perform any of the methods as described herein when executed by a computer. A computer program product may comprise the computer program.

According to a further aspect, a sending device for controlling a play-out of a media data stream at a receiving device is provided, the media data stream comprising one or more programs and each program comprising one or more program components. The sending device comprises a processing unit or any other component adapted to define a zone description for a media zone for at least one program of said one or more programs or at least one program component of said one or more program components in the media data stream, the zone description identifying the media zone for said at least one program or said at least one program component in the media stream, wherein the processing unit or other component is further adapted to associate the zone description to a program specific information data segment, the program specific information data segment being a part of the media data stream and comprising data specifying information at least regarding to said at least one program or said at least one program component; and a transmission unit or any other component adapted to transmit the media data stream towards the receiving device.

The sending device may be adapted to determine an identifier for identifying the media zone in the media stream, and to insert the identifier into the zone description. The sending device may also be adapted to determine at least one further element of a group of further elements comprising further identification information for identifying start, end or duration of the media zone in the media data stream,
a play-out control instruction regarding the play-out of the media zone,
information for inserting media data into the media zone,
rights management information regarding the media zone, and
integrity protection information for protecting the integrity of at least one of the media zone and the zone description or parts thereof.

The sending device may be adapted to insert the at least one further element into the zone description or a zone descriptor comprising the zone description. The play-out control instruction may convey zone type information in accordance with the Marlin Dynamic Media Zones specification.

Still further, the sending device may be adapted to determine the protection integrity information regarding the zone description. Determining the protection integrity information may comprise performing a cryptographic signature over the zone description to obtain a signature value. The cryptographic signature may be performed using a cryptographic key delivered in an ECM, or a cryptographic key derived therefrom. The cryptographic key may be the key used to protect the media stream.

The sending device may be adapted to determine that at least one of said one or more program components is protected, to set a zone indication parameter in accordance with the protection determination, and to associate the zone indication parameter to a data segment preventing unauthorized play-out of at least one of said one or more program elements, said data segment being part of the media data stream. The sending device may also be adapted to perform an integrity protection of the zone indication parameter.

The data segment preventing unauthorized play-out may be an ECM. Moreover, the zone indication parameter may be a zone information notification flag or a zone descriptor counter.

In one variant, the device is adapted to trigger the definition of the program specific information data segment whenever an update of the zone description occurs.

According to another aspect, a receiving device for controlling a play-out of a media data stream at the receiving device is provided, the media data stream comprising one or more programs and each program comprising one or more program components. The receiving device comprises a receiver unit or any other component adapted to receive the media data stream comprising a program specific information data segment, the program specific information data segment having associated a zone description for a media zone defined for at least one program of said one or more programs or at least one program component of said one or more program components, the program specific information data segment further comprising data specifying information at least regarding said at least one program or said at least one program component, the zone description identifying the media zone for said at least one program or said at least one program component in the media stream; a processing unit or any other component adapted to detect in the media data stream the program specific information data segment comprising the zone description and to identify, based upon an analysis of the zone description, the media zone and to determine a play-out control instruction for the play-out of the media zone; and an output unit or any other component adapted to play-out the identified media zone according to the determined play-out control instruction.

The receiving device may be adapted to identify the media zone from an identifier in the zone description. Still further, the receiving device may be adapted to determine from the zone description at least one further element of a group of further elements comprising further identification information for identifying start, end or duration of the media zone in the media data stream,
a play-out control instruction regarding the play-out of the media zone,
information for inserting media data into the media zone,
rights management information regarding the media zone, and
integrity protection information for protecting the integrity of at least one of the media zone and the zone description or parts thereof.

Based on the determined further element at least one operation may be performed from a group of operations comprising identifying start, end or duration of the media zone in the media data stream based on the further identification information,
performing the play-out of the media zone according to the play-out control instruction determined from the zone description,
determining media data that is in accordance with the information for inserting media data into the media zone and inserting said media data into the media zone,
determining rights management data and operations from the rights management information and applying the determined rights management data and operations to the media zone, and
verifying the integrity protection information for verifying the integrity of at least one of the media zone and the zone description or parts thereof.

The receiving device may be adapted to determine the integrity protection information regarding the zone description. Still further, the device may be adapted to receive an ECM. The ECM may contain a cryptographic key, and the integrity protection information may be a signature value obtained by performing a cryptographic signature over the zone description using the cryptographic key.

Moreover, the receiving device may be adapted to detect in the media stream a zone indication parameter associated to a data segment preventing unauthorized play-out of at least one of said one or more programs or said one or more program elements, and to perform a security operation regarding at least one of said one or more programs, said one or more program elements, the media zone, and the zone description. An integrity protection verification procedure of the zone indication parameter may be performed also.

Generally, the data segment preventing unauthorized play-out may be an ECM, and the zone indication parameter may be a zone information notification flag or a zone descriptor counter. In such a case, the receiving device may be adapted to receive the zone information notification flag in the ECM, the zone information notification flag signaling that the program specific information data segment contains a zone description. The program specific information data segment may be examined to find out if the zone information notification flag is set.

The receiving device may be adapted to verify the integrity protection information based on a cryptographic key received in the ECM. In one example, the cryptographic key is the key used to protect the media stream.

Whenever an update of the program specific information data segment is detected, the receiving device may perform the detection of the media zone and the determination of the play-out control instruction.

Also provided is a system comprising the sending device and the receiving device. Both devices may be configured to execute any of the method aspects disclosed herein.

Any operations, steps or functions of the method aspects disclosed herein when carried out by the sending device or the receiving device may be performed by one or more units of the respective device. As an example, any processing-related operations, steps or functions such as, for example, "defining", "associating", "determining", "inserting", "performing", "setting", "triggering", "identifying", "verifying" and so on may be performed by the respective processing unit. The processing unit may be a monolithic device or comprise individual sub-units.

The following considerations apply to all method and device aspects disclosed herein.

The media data stream may generally be a transport stream according to the MPEG-2 transport stream format. The program specific information data segment may be a table (e.g., at least one of a Program Map Table, or PMT, a Conditional Access Table, or CAT, a Program Association table, or PAT, and a—e.g., newly defined—private table of the transport stream).

Information may be included in the PMT and in an Entitlement Control Message, or ECM, together. The program specific information data segment may be the PMT, the zone description may be included in the (e.g., newly defined) private table, and the PMT may be associated to the private table and the zone description included therein via a first Packet Identifier, or PID. Additionally, or alternatively, the program specific information data element may be the PMT, wherein the PMT can be associated to an ECM, via a second Packet Identifier, or PID. The zone description may generally be a descriptor of the table.

In one implementation, the media zone is a media data stream segment that has special properties in that it may not be skipped or must be played from the start to the end. The media zone can generally be a media zone in accordance with the Marlin Dynamic Media Zones specification.

BRIEF DESCRIPTION OF THE DRAWINGS

Further details, aspects and advantages of the present disclosure will become apparent from the following description of exemplary embodiments in conjunction with the drawings, wherein.

DETAILED DESCRIPTION

In the following description, for purposes of explanation and not limitation, specific details are set forth, such as specific device configurations and specific signaling scenarios, in order to provide a thorough understanding of the present disclosure. It will be apparent to one skilled in the art that the techniques presented herein may be practiced in other embodiments that depart from these specific details. The skilled artisan will appreciate, for example, that the techniques discussed herein may be practiced in combination with other device configurations and different signaling steps.

Those skilled in the art will further appreciate that the methods, steps and functions explained herein below may be implemented using individual hardware circuitry, using software functioning in conjunction with a programmed microprocessor or a general purpose computer, using one or more Application Specific Integrated Circuits (ASICs), one or more Digital Signal Processors (DSPs) and/or one or more Field Programmable Gate Arrays (FPGAs). It will also be appreciated that the methods, steps and functions disclosed herein may be embodied in a processor and a memory coupled to the processor, wherein the memory stores one or more programs that perform the steps discussed herein when executed by the processor.

The following description will mainly relate to a combination of the Marlin DMZ concept and MPEG-2 TSs. It will be appreciated that the techniques presented herein are not limited to media zones according to the Marlin specification and transport streams according to the MPEG-2 specification.

Figure 1:
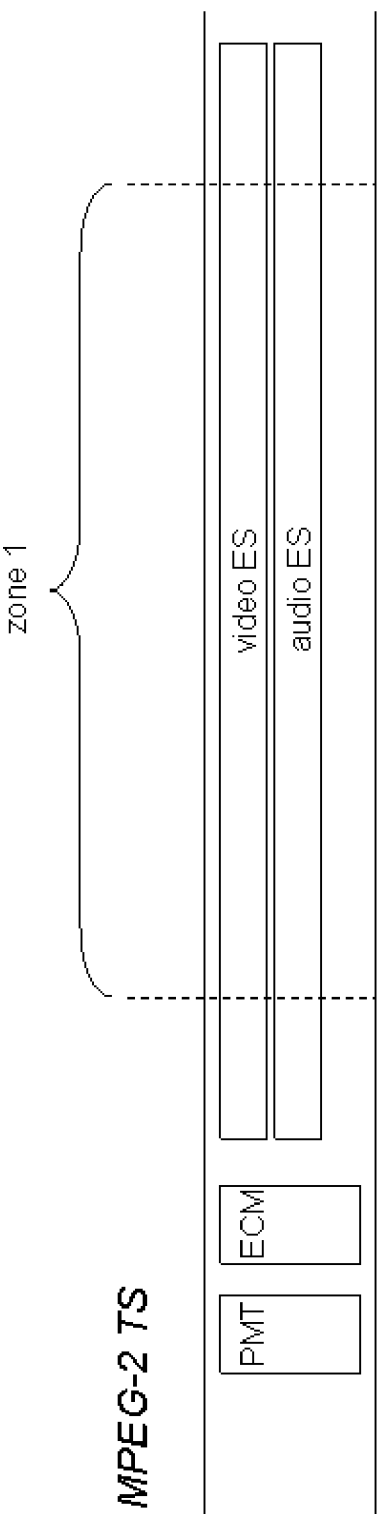
FIG. 1 schematically illustrates an embodiment of data entities in an MPEG-2 transport stream that includes a media zone.

FIG. 1 schematically illustrates an embodiment of the data entities in an MPEG-2 TS. As shown in FIG. 1, the TS comprises one or more tables including at least one Program Map Table (PMT) as will be discussed in more detail below with reference to FIGS. 5 and 6. Additionally, one or more Entitlement Control Messages (ECMs) are optionally included in the TS, in particular in case protected content is transported. The content of the TS may comprise one or more Elementary Streams (ESs). In the example illustrated in FIG. 1, a single video ES and single audio ES are illustrated. Within the video ES and audio ES, a media zone ("zone 1") with special properties (e.g., regarding play-out) is defined in accordance with the Marlin DMZ (or any other) specification.

The media zone may be defined for a program as shown in FIG. 1, i.e., for the whole program with all program components, but there might be applications where a media zone may only be defined for a subset of the program components of a program, for example only for the video stream while for the audio stream no media zone is defined (which might be useful for live broadcasts especially of sport events such that users can still listen to the reporter during the time period of the video-based media zone comprising, for example, a video-based advertisement). There may also be more than one media zone defined and processed.

Consider the following example for the MPEG-2 TS illustrated in FIG. 1. FIG. 1 provides play-out information about "media zones" within the MPEG-2 TS. This information is included as a descriptor, for example, inside the regularly repeated PMTs that are part of each MPEG-2 TS (for MPEG-2 systems, see ISO/IEC 13818-1, also published as ITU-T H.222.0), reference [5] hereinafter).

For unprotected content, the descriptor may typically not be protected against modification. For protected content, the descriptor may be complemented by some information that is carried in the ECMs. The detailed description below describes exactly the information that is included, for example, in the PMT (or other table) and (optionally) ECM. In addition, a few policies/compliance rules are defined that may be obeyed by a receiving device with play-out capabilities. Furthermore, it is described how keys may be updated in order to make the system secure against replaying old PMTs (or other tables).

A media zone is in the simplest case a usage rule. For instance, the user is not allowed to use trick modes (e.g., fast forward) during a commercial break. Thus, the Set Top Box (STB) receives with the content (or media) stream the media zone information, which describes the usage rules. As stated above, embodiments herein thus provide information about "media zones" (see reference [1]) within an MPEG-2 transport stream as shown in FIG. 1.

Such a transport stream may comprise one or more programs (e.g., TV or and/or radio program(s)), each program comprising one or more program components. For example, a radio program may comprise an audio program component and a TV program may comprise an audio program component and a video program component.

The MPEG-2 transport stream format is defined in reference [5]. This includes PMT, PAT and other table definitions. In the following some particularities of MPEG-2 are described for illustration (taken from http://en.wikipedia.org/wiki/MPEG_transport_stream and http://en.wikipedia.org/wiki/Program_Specific_Information, both references included by reference), wherein the term "Elementary Stream" (or ES, see FIG. 1) serves as an example for the term "program component". In case of uncertainty, the description in reference [5] prevails.

In the following, various terms in the MPEG context will be explained in more detail to provide a better understanding of the embodiments discussed herein.

Transport stream (TS, TP, MPEG-TS, or M2T) is a communications protocol for audio, video, and data. It is a type of digital container format that encapsulates packetized elementary streams and other data. TS is specified in MPEG-2 Part 1, Systems (ISO/IEC standard 13818-1). It is also known as ITU-T Rec. H.222.0. Its design goal is to allow multiplexing of digital video and audio and to synchronize the output. Transport stream offers features for error correction for transportation over unreliable media, and is used in broadcast applications such as DVB and ATSC. It is contrasted with MPEG program stream, designed for more reliable media such as DVDs.

PID

Each table or elementary stream in a transport stream is identified by a 13-bit packet ID (PID). A demultiplexer extracts elementary streams from the transport stream in part by looking for packets identified by the same PID. In most applications, Time-division multiplexing will be used to decide how often a particular PID appears in the transport stream.

Programs

Transport stream has a concept of programs. Each single program is described by a Program Map Table (PMT) which has a unique PID, and the elementary streams associated with that program have PIDs listed in the PMT. For instance, a transport stream used in digital television might contain three programs, to represent three television channels. Suppose each channel consists of one video stream, one or two audio streams, and any necessary metadata. A receiver wishing to decode a particular "channel" merely has to decode the payloads of each PID associated with its program. It can discard the contents of all other PIDs. A transport stream with more than one program is referred to as MPTS—Multi Program Transport Stream. A single program transport stream is referred to as SPTS.

Program Specific Information (PSI)

PSI tables include Program Association (PAT), Program Map (PMT), Conditional Access (CAT), and Network Information (NIT). The MPEG-2 specification does not specify the format of the CAT and NIT.

Program Specific Information (PSI) is metadata about a program (channel) and part of a MPEG transport stream.

The PSI data contains may include e.g. the following tables:

PAT (Program Association Table)
CAT (Conditional Access Table)
PMT (Program Map Table)
NIT (Network Information Table)
TDT (Time and Date Table)

PSI is carried in the form of a table structure. The table structure can span multiple transport stream packets. Adaptation field also occurs in TS packets carrying PSI data. The PSI data are typically not scrambled so that the decoder at the receiving end can easily identify the properties of the stream.

The PAT, CAT and TDT tables are associated with predefined PID. There may be multiple independent PMT tables in a stream; these are given user-defined PID numbers (as are PES (Packetized Elementary Stream) packets). PMT table PIDs are defined in the PAT, and are the only PIDs defined there (PES PIDs are defined in the PMT). Each table has predefined structure.

PAT

PAT stands for Program Association Table. It lists all programs available in the transport stream. Each of the listed programs is identified by a 16-bit value called program_number. Each of the programs listed in PAT has an associated value of PID for its Program Map Table (PMT).

The value 0x0000 of program_number is reserved to specify the PID where to look for Network Information Table (NIT). If such a program is not present in PAT the default PID value (0x0010) shall be used for NIT.

PMT

Program Map Tables (PMTs) contain information about programs. For each program, there is one PMT. While the MPEG-2 standard permits more than one PMT section to be transmitted on a single PID, most MPEG-2 "users" such as ATSC and SCTE require each PMT to be transmitted on a separate PID that is not used for any other packets. The PMTs provide information on each program present in the transport stream, including the program_number, and list the elementary streams that comprise the described MPEG-2 program. There are also locations for optional descriptors that describe the entire MPEG-2 program, as well as an optional descriptor for each elementary stream. Each elementary stream is labeled with a stream_type value.

CAT (Conditional Access Table)

This table is used for conditional access to the streams. This table provides association with EMM stream. When the TS is scrambled then this section contains the EMM PID. This EMM pid is encrypted using the smart card number. The PID value is 0x0001.

PCR

To enable a decoder to present synchronized content, such as audio tracks matching the associated video, at least once each 100 ms a Program Clock Reference, or PCR is transmitted in the adaptation field of an MPEG-2 transport stream packet. The PID with the PCR for an MPEG-2 program is identified by the per_pid value in the associated Program Map Table. The value of the PCR, when properly used, is employed to generate a system_timing_clock in the decoder. The STC decoder, when properly implemented, provides a highly accurate time base that is used to synchronize audio and video elementary streams. Timing in $MPEG_2$ references this clock, for example the presentation time stamp (PTS) is intended to be relative to the PCR. The first 33 bits are based on a 90 kHz clock. The last 9 are based on a 27 MHz clock. The maximum jitter permitted for the PCR is +/−500 ns.

NIT (Network Information Table)

This table provides information about the multiplexes and transport streams on a given network.

Information about the current network uses table_id of 0x40, that about other networks uses table_id of 0x41.

It is segmented into network information sections and is carried on PID 0x0010. [ref EN300468]

Also this table contains the private stream information too. For example, TeleText, Subtitle and MHEG.

TDT (Time and Date Table)

Provides UTC (Universal Time) coded as MJD (Modified Julian Date). The PID value is 0x0014.

For TDT—Table ID is 0x70 For TOT—Table ID is 0x73

In the following, various terms in the media zone context will be explained in more detail to provide a better understanding of the embodiments discussed herein.

A media zone is a segment of the media stream(s) that has special properties (e.g., it may not be skipped over, or it must be played from the start to the end). Typical usages for a media zone are advertisements in programs that the user shall not be able to skip, or legal information that the user must watch before the program starts. A zone description describes properties of one or more media zones.

In one embodiment, provision of the media zone(s) is done by including information (a zone description) within a descriptor inside the regularly repeated PMT that are part of each MPEG-2 TS.

Alternatively, other MPEG-2 tables may be used to carry zone descriptions (e.g., the PAT, or the CAT, or a newly defined "private table" such as a "Zone Map Table"). In the following, even if the PMT table is mentioned, it is understood that this could be another table type.

MPEG-2 TS allows defining new descriptors (see table 2-39 of reference [5]). This newly defined descriptor, here called zone descriptor, would, in one embodiment, contain the following elements:

Zone descriptor counter (identifier of current zone descriptor) [optional]
For each zone {
Zone identifier
Zone Start (timecode and optional byte offset) [optional]
Zone End [optional]
Zone Properties [optional]
External Zone Reference [optional]
DRM system identification [optional]
DRM content ID [optional]
DRM RI URL [optional]
Signature-Key-ID [optional]
Signature-Algorithm [optional]
Signature-Value [optional]
}
Signature-Key-ID [optional]
Signature-Algorithm [optional]
Signature-Value [optional]

The structure of a PMT including a Zone Descriptor will be described later with reference to the drawings.

In the following, the meaning of the individual fields of the zone descriptor according to the above embodiment will be discussed in more detail.

Zone identifier: id of the Zone, e.g., as defined in reference [1]. For DRM and CA systems that are aware of media zones, this may be used to assign license and zone specific usage restrictions, e.g., no fast forward. (Typically there are also default usage restrictions defined for s a specific zone type, which may be complemented or replaced by more specific usage restrictions).

Zone Start: Reference into the MPEG2-TS to the begin of a zone. This may, e.g., be a value representing the System Time Clock (STC) as defined in MPEG2-TS and as transmitted to the client (receiving device) by means of the Program Clock Reference (PCR).

Alternatively, this may also be any other time reference or other reference to a point in the MPEG2-TS, e.g., to the Presentation Time Stamp (PTS) or a byte offset. Note that this reference may point to any point in the MPEG2-TS, such as, a point in the future or past. The zone start is optional. If it is not present in the zone descriptor, the zone may start as soon as the associated PMT gets valid, i.e. the zone may start with the data that immediately follows the PMT in the MPEG2-TS.

The PMT table may also include a byte offset (optional) which describes the number of bytes between the media zone start and the current position in the stream. A user may jump to the middle of a media zone when watching a live program in time shift. Thus, the STB must find the start of the media zone. Another option for finding the start of the media zone is the zone start info.

Zone End: Reference into the MPEG2-TS indicating the end of a zone. This item is optional as it may not yet be available in some cases, e.g., in case of a live program. If this value is not present, a receiving device must assume that the zone did not yet end (provided it did already start). This reference may be absolute, i.e., pointing directly to the end of the zone or relative, i.e., expressing, e.g., a duration, and point to the end of the zone together with some other information, e.g., the reference in the Zone Start field. This may, e.g., be a value representing the System Time Clock (STC) as defined in MPEG2-TS and as transmitted to the client by means of the Program Clock Reference (PCR). Alternatively, this may also be any other time reference or other reference to a point in the MPEG2-TS, e.g., to the Presentation Time Stamp (PTS) or a byte offset.

Zone Properties: This field may be used to signal properties of zones. This may be, for example, usage restrictions such as no fast forward, for unprotected content or similar default restriction (that may be overwritten by licenses) for protected content. For example, the field may convey the attributes or zone type information defined in reference [1]. (E.g. there are so-called "sticky" and "magnetic" zones; "sticky" zones cannot be left before fully played after being entered; "magnetic" zones cannot be skipped over).

External Zone Reference: Reference to an external zone, e.g., a URL and corresponding information as described in reference [4], via which content can be obtained that shall be shown while being in this zone.

DRM system identification [optional]: reference to the used DRM or Conditional Access (CA) System DRM content ID: DRM or CA system specific identifier for a license that may be used to access the content of zone.

DRM RI URL [optional]: DRM or CA system specific information used to obtain a license.

Signature-Key-ID: To protect the integrity of the information describing the zone as defined here, a cryptographic signature may be used. This field may contain a reference to identify the key used for this signature. This may, e.g., be an indication if the odd or even scrambling used to protect the content in the MPEG2-TS can be utilized to verify the signature. Alternatively or in addition, the field may contain a reference to a key transmitted in a (DRM/CA) license such as a content key.

Signature-Algorithm [optional]: The field may be used to signal the cryptographic algorithm (signature algorithm) used to protect the integrity of the zone description. This may, e.g., point to a MAC algorithm such as HMAC relying on a secure hash function such as SHA-1 or a member of the SHA-2 family.

Signature-Value [optional]: Value of the cryptographic signature over this zone description, i.e. if there is one signature per zone; or the value of the cryptographic signature over several zone descriptions, i.e. if there is one signature for a collection of zones. The signature may be obtained e.g. using an HMAC algorithm as referred to above, and a key. This key, may e.g., be the (odd/even) key used to protect the media stream and delivered in the ECM. It may also be derived from this key, e.g., using a cryptographic key derivation algorithm (e.g., based on an HMAC) or any other key, e.g., the one transported in the DRM/CA system's license.

There could be multiple zone descriptions conveyed in an MPEG-2 TS, e.g., referring different DRM systems. This could for example be the case in a Simulcryp MPEG-2 transport stream, where the media are protected by different CA or DRM systems.

Optional Signaling in ECMs

For unprotected content, the descriptor may typically not be protected against modification. For protected content, the descriptor may be complemented by some information that is carried in the ECMs. This ECM information could, e.g., contain the following:

Zone information notification flag: this flag, if, e.g., set to 1, signals that the PMT contains zone-descriptor and that the receiving device needs to examine PMT and extract the zone-descriptor Note that the existence of a zone description in the PMT can also be signaled by other means. For example, the DRM system may signal when evaluating a license, that this license is only valid if zone-descriptions can be found.

Zone descriptor counter: identifies zone descriptor valid for this ECM

Since for some DRM/CA systems ECMs may not be integrity protected and can thus be modified, there may be an additional mechanism that makes sure the zone information notification flag is not modified. E.g., the protected key carried in the ECM could be XORed (before protection/encryption) with the zone information notification flag. Thus, even if PMT has been modified and zone information been removed, the device either sees zone information notification flag ands thus notices that zone information is missing, or, if also zone information notification flag has been removed or changed, the key derivation results in a wrong key (since the XOR operation is not applied correctly), and the audio/video ESs cannot be decrypted properly.

PMT Updates

The PMT including the zone map description, e.g., may be updated when a new zone starts or an old one ends. The PMT may contain descriptions for multiple zones, e.g., zero, one or several past zones, the current zone, and zero, one or several future zones. Zone descriptions may also be updated during playback of a zone, e.g., once the end point of a zone is know.

Key Switching as PMT Replay Protection

It might need to be avoided that old PMT entries (without restrictions) can be replayed in order to tamper with the intended zone behavior. If ECMs are used, they convey traffic keys, that may (as described above) also be used to derive a signature of the zone description in the PMT. To avoid tampering with the zones description, e.g., by replaying old zone descriptions, the traffic keys shall be changed when ever a new zone starts and a player shall only accept signatures that were calculated using the same key that is also used for traffic protection.

Compliance Rules

A compliant receiving device should typically follow a few policies and rules in order to enforce the desired behavior:

If, for example, via signaling the ECM or the DRM license or by other means, a zone description is expected in the PMT and if this description can not be found, the stream should not be decrypted.

If integrity protection for the zone description is required (e.g., by a specific system specification or by an additional flag in an integrity protected ECM), the device shall calculate the signature value of the received zone description, e.g., using the cryptographic key as indicated by the zone description. If this signature does not match the signature send with the zone description, the stream should not be decrypted. The signature may be calculated separately over the information for one zone, or it may be calculated over the description for several zones together, as mentioned above.

If replay protection as described above is used, the stream should not be decrypted if the key used to protect the integrity of the zone description is different from the key used to protect the actual media stream.

The device should evaluate the zone descriptor in PMT, and enforce zone behavior described therein.

If ECMs are transmitted, the device should verify that the ECM signaling and PMT signaling are not in contradiction. If they are in contradiction, the stream should not be decrypted.

If ECMs are transmitted and the (optional) additional protection mechanism described above is used, the device should XOR Zone information notification flag and the key signaled (in protected form) in ECM. If decryption fails, this is an indication that the information has been tampered with, and after multiple failures device should not further decrypt the stream.

In the following, an embodiment of a play-out control system comprising a sending device 100 and a receiving device 200 will be described with reference to FIG. 2. Aforementioned media zone descriptions may be embedded into an MPEG2-TS by the sending device 100 and evaluated by the receiving device 200.

Figure 2:
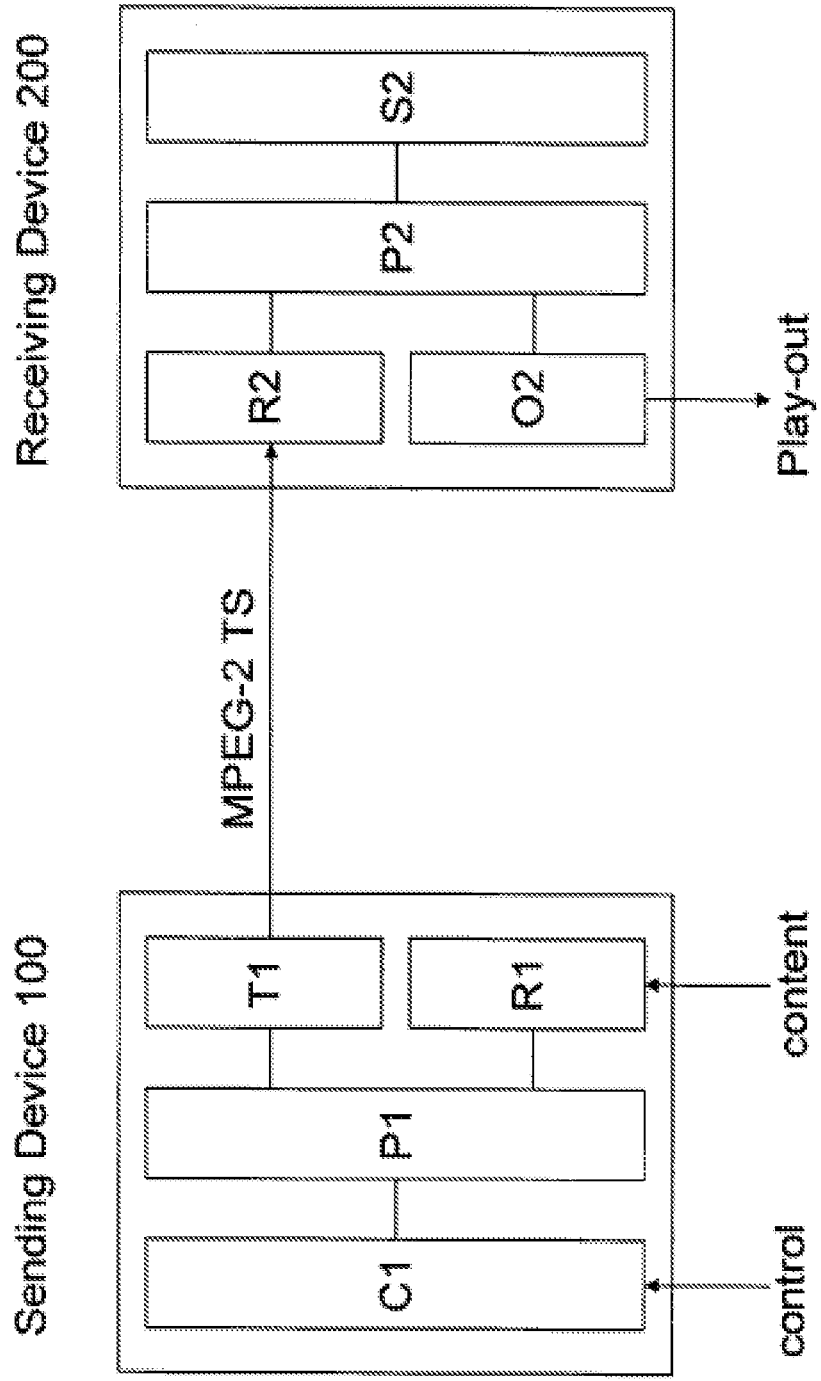
FIG. 2 exemplarily illustrates a system embodiment comprising a sending device and a receiving device.

The sending device 100 comprises a processing unit P1, a transmission unit T1, a receiver unit R1 and a control unit C1 and typically a data storage unit not shown in FIG. 2. The sending device 100 receives content, e.g., encoded video and/or audio content, via the receiver unit R1, for example, from some other device or from another unit in the same device such as a storage unit. The control unit C1 receives control information associated with the content and specifying the media zone or media zones, e.g., via media zones ids, usage restrictions and/or zone properties that shall be applied to the received content (note, a program or a program element, respectively, comprises content, the received content may be for one or more program elements of one or more programs). Alternatively or in addition, the control information and/or the content may be stored and/or generated at the sending device 100 and taken from there to define the zone descriptor and the program component(s) for the program of a media data stream). Note that C1 and R1 may also be integrated into a single unit.

Figure 3:
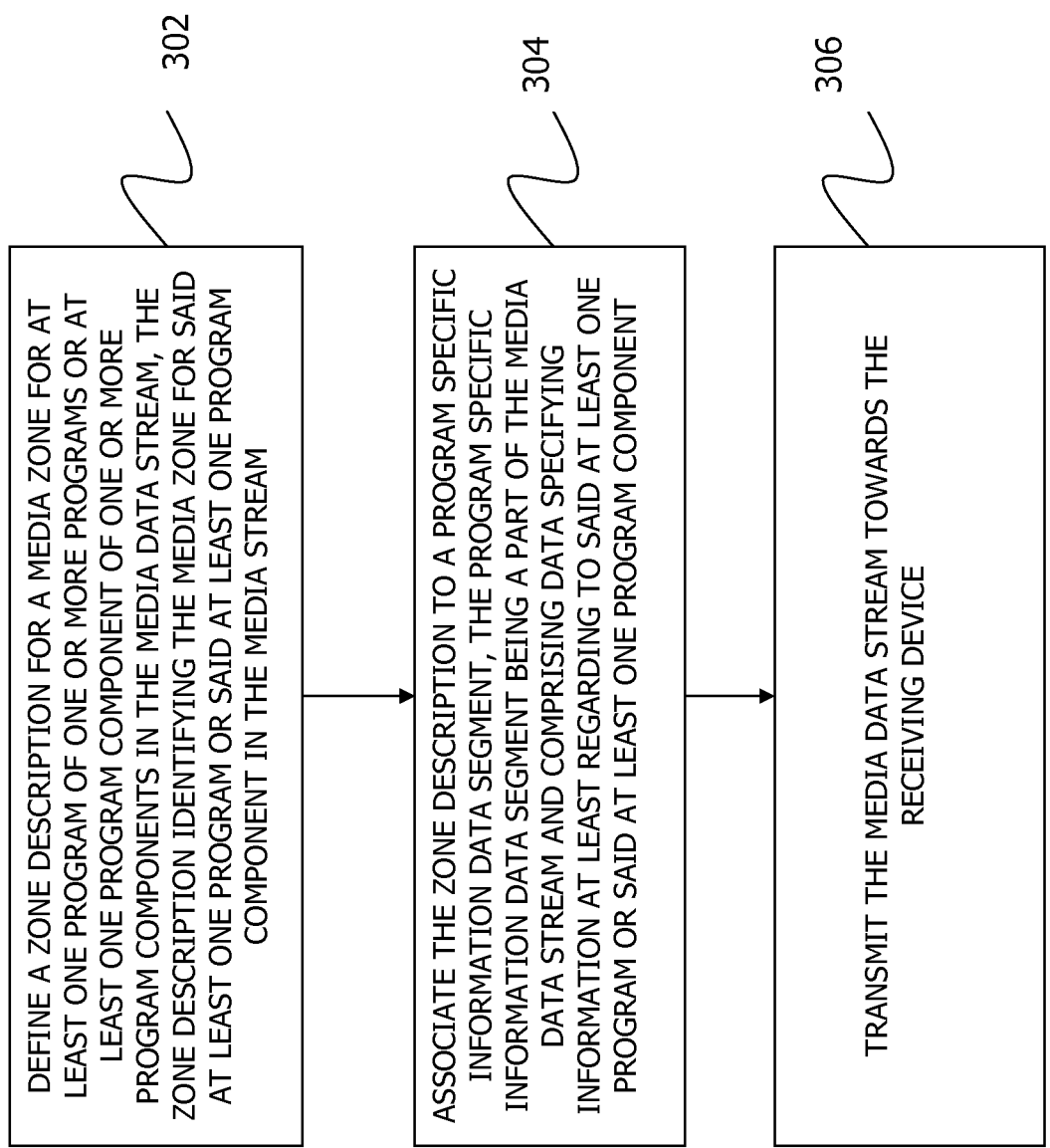
FIG. 3 shows a flow diagram of a first method embodiment illustrating the operation of the sending device in FIG. 2.

The following sections describe an embodiment of an operation of the sending device 100. The operation will be described with reference to the flow diagram 300 of FIG. 3.

Content and respective control information is received.

A PMT update by P1 is initiated, e.g.

if control information changes for the respective content, if keys in ECM change (optionally for protected content)

after some time or time interval (optionally)

At PMT update, the processing unit P1 creates a new Zone Description and/or updates an existing (stored) Zone Description, e.g., if a formerly not know Zone End reference is now available. According to step 302, the Zone Description (for a media zone for at least one program or at least one program component) is thus defined. As has been explained with reference to the above zone descriptor embodiment, the Zone Description identifies the media zone for the program or program component in the media stream.

If the content is protected, the processing unit P1 may now compute one or more cryptographic Signatures over the Zone Description(s), e.g., using a MAC algorithm such as HMAC relying on a secure hash function such as SHA-1 or a member of the SHA-2 family. The cryptographic key may be the same one as transmitted in the ECMs or may be derived from this key. The key may be extracted from received ECMs (for content that was already received protected), may be part of the control information or may also be generated (randomly) by P1.

Using above information, P1 generates one or more Zone Descriptors and embeds them into existing or newly generated PMTs. According to step 304, the Zone Description is thus associated to the PMTs (i.e., to program specific information data segments). By the embedding, the PMTs become part of the MPEG-2 TS.

T1 transmits the content in step 306 as MPEG2-TS with embedded PMTs to the receiving device 200 (as shown in FIG. 1).

Using above information, P1 optionally generates additional information and embeds them into existing or newly generated ECMs.

T1 transmits the ECMs to the receiving device 200.

The receiving device 200 comprises a processing unit P2, a receiver unit R2, an optional storage unit S2 and an output unit O2.

The receiving device 200 receives content, packaged in MPEG-2 TS as illustrated in FIG. 1, via the receiver unit R2, for example, from the sending device 100, or from another unit in the same device 200 such as a hard disk.

Figure 4:
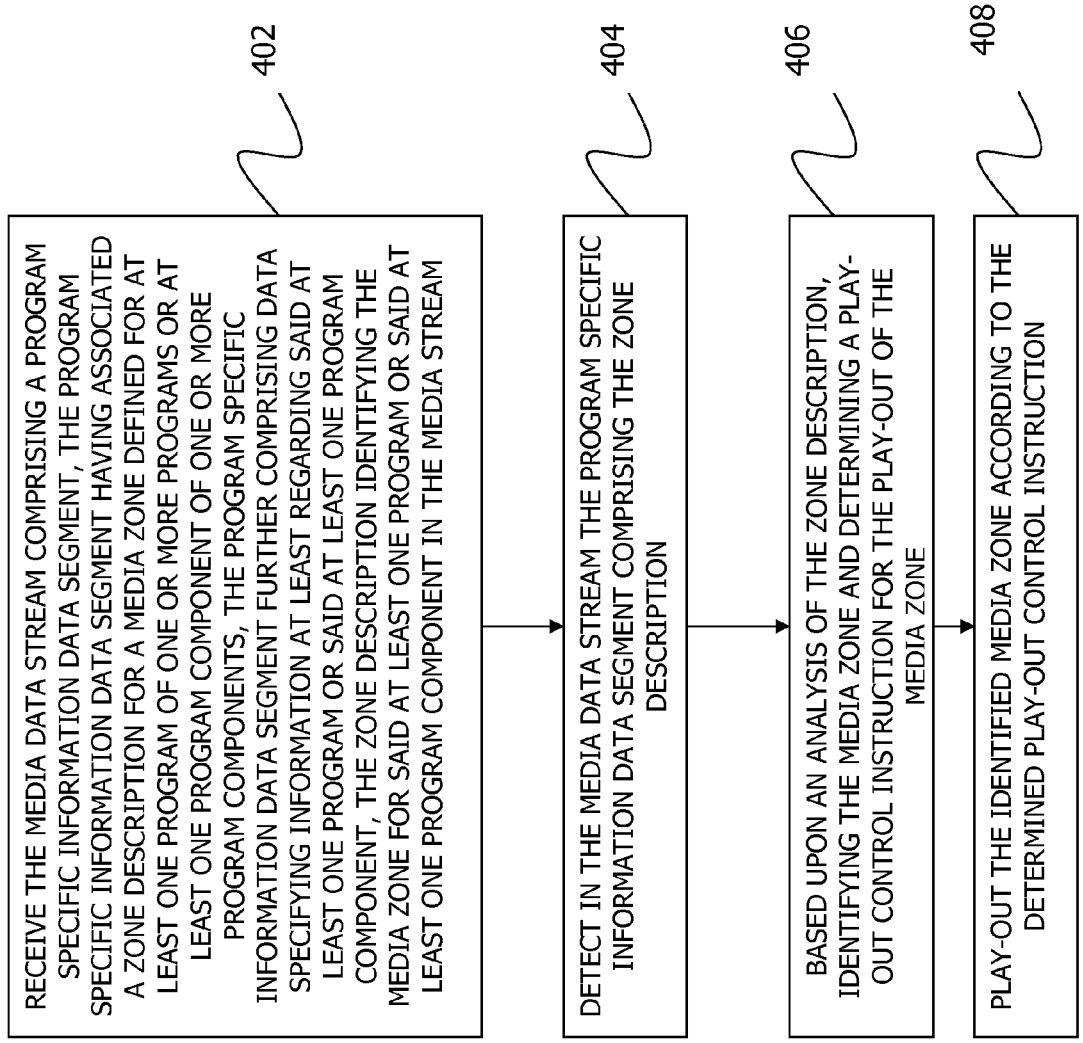
FIG. 4 shows another flow diagram of a second method embodiment illustrating the operation of the receiving device in FIG. 2.

The following sections describe an embodiment of an operation of the receiving device 200. The embodiment will be described with reference to the flow diagram 400 of FIG. 4.

MPEG-2 TS comprising PMTS is received by R2 in accordance with step 402 and processed by P2.

The tables within the MPEG-2 TS detected in accordance with step 404 are examined in accordance with step 406. If PMT contains Zone Description, the Zone Description is analyzed, and the information therein evaluated and optionally stored in S2. As illustrated by step 406, the analysis of the Zone Description is performed to identify the media zone and determine a play-out control instruction (or rule) for the play-out of the media zone.

If ECMs are received, the received ECMs are also examined. If ECMs contain information relating to Zone Descriptions, this information is analyzed, and the information therein evaluated and optionally stored in S2. The information in ECMs is used to verify the information previously retrieved from PMT. For example, the key in ECM is used to verify the signature(s) in the Zone Description.

If the information in PMT, or in PMT and ECM together, yields an error condition (e.g., according to compliance rules such as the ones discussed in a previous section), further processing and rendering of the media is stopped by P2.

Otherwise, media received over R2 are decrypted and decoded, and sent to O2 for playout (see step 408) according to applicable rules for the media zones (e.g., zones that may not be skipped over, are not skipped over).

In the following, two embodiments for associating the zone description (as defined in the zone descriptor) to program specific information data segments will be described with reference to FIGS. 5 and 6.

Figure 5:
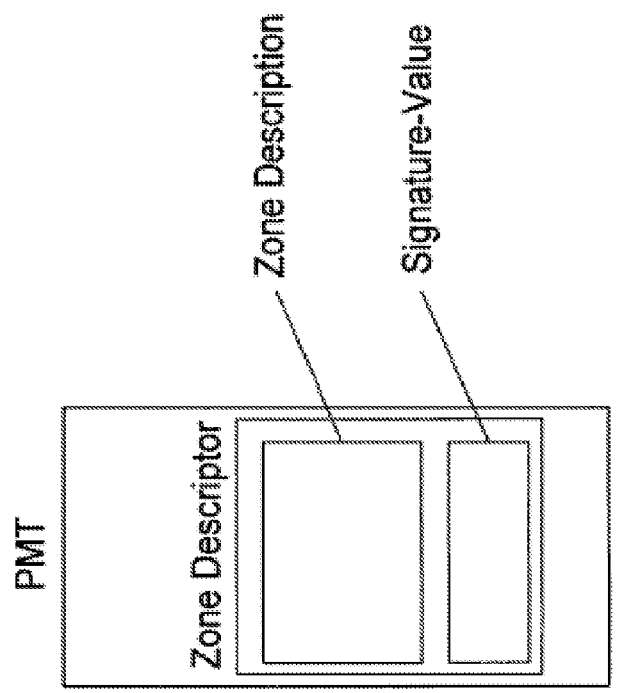
FIG. 5 is a schematic diagram illustrating a first embodiment of a program specific information a data segment.

FIG. 5 shows the structure of a PMT which includes the zone descriptor with its various elements including a zone description and a signature value. The signature key for verifying the signature value may be received with the ECM. The PMT and ECM may be embedded in an MPEG-2 TS as illustrated in FIG. 1.

Figure 6:
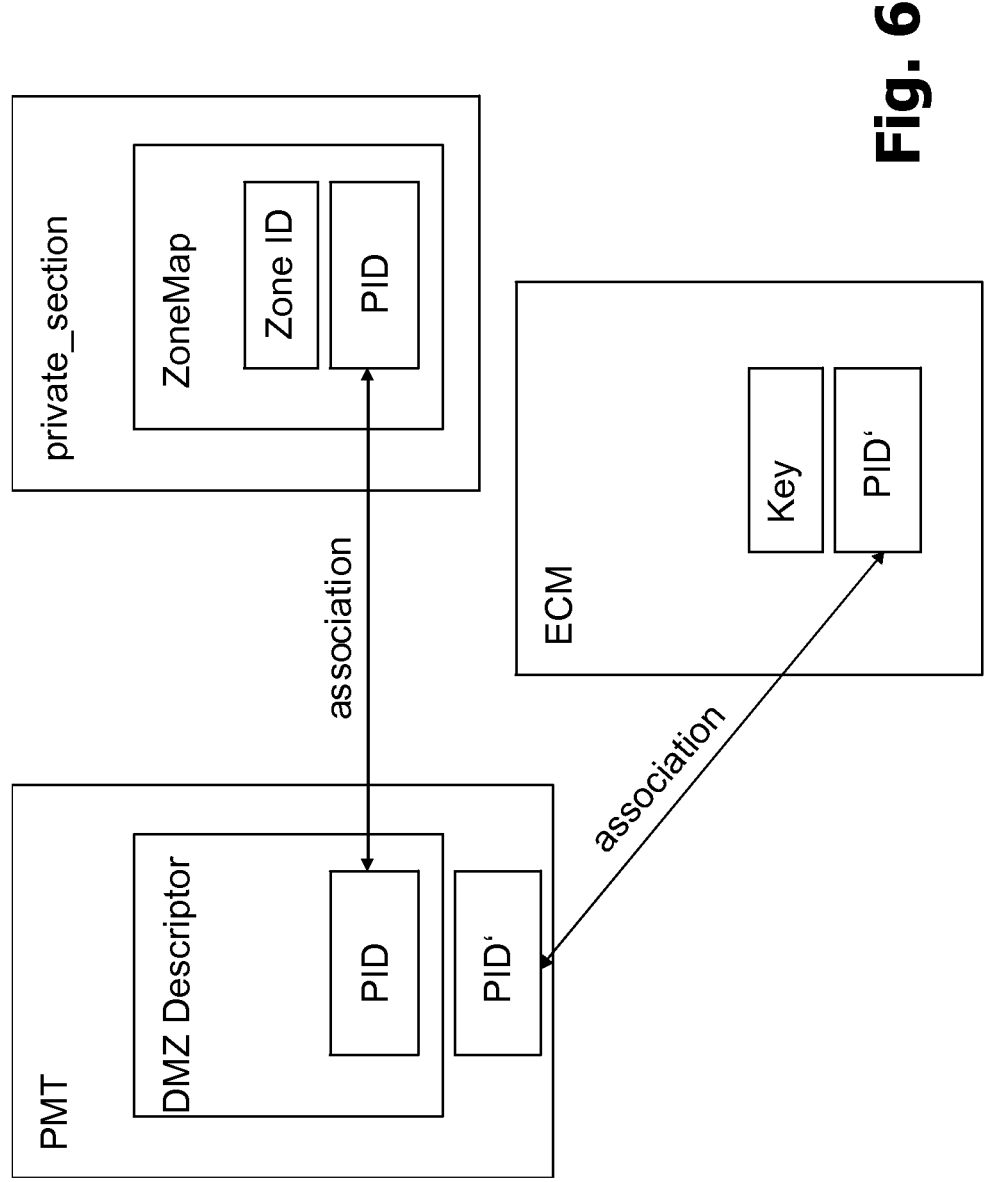
FIG. 6 is a schematic diagram illustrating a second embodiment of a program specific information data segment.

FIG. 6 illustrates another embodiment for associating the zone description to the PMT. As illustrated in FIG. 6, the zone description (zone map) is included in a private section of an MPEG-2 private table (that may comprise one or more additional private sections for other purposes). The PMT is associated to the private section (and thus to the private table) and the zone description included therein via a first PID. The PMT is further associated to an ECM via a second PID. As explained above, the ECM transports the signature key required for verifying a signature value included in the zone map (not shown in FIG. 6). The private table is transmitted together with the PMT and the ECM (as illustrated in FIG. 1) in the MPEG-2 TS.

As has become apparent from the above description of exemplary embodiments, the technique presented herein provides a solution to the requirements/needs for forced play-out that supports MPEG-2 TS and is usable both for encrypted and unencrypted content, as discussed in OIPF.

While the technique presented herein has been described with respect to particular embodiments, those skilled in the art will recognize that the present invention is not limited to the specific embodiments described and illustrated herein. It is to be understood that this disclosure is only illustrative. Accordingly, it is intended that the invention be limited only by the scope of the claims appended hereto.

The invention claimed is:

1. A method for controlling play-out of a media data stream at a receiving device, the media data stream comprising one or more programs, each program comprising one or more program components, the method comprising
defining, for at least one program of said one or more programs or at least one program component of said one or more program components in the media data stream, a zone description that identifies a media zone for said at least one program or said at least one program component in the media data stream, wherein the media zone is a segment of the media data stream that has special properties, wherein the media data stream is a transport stream according to the Moving Pictures Expert Group-2 (MPEG-2) transport stream format,
associating the zone description with a program specific information data segment, the program specific information data segment being a part of the media data stream and comprising data specifying information regarding said at least one program or said at least one program component, wherein the program specific information data segment is a Program Map Table (PMT) of the transport stream, wherein the zone description is included in a private table of the transport stream, and wherein the PMT is associated with the private table and the zone description included therein via a first Packet Identifier (PID), and
transmitting the media data stream towards the receiving device.

2. The method according to claim 1, the method further comprising determining an identifier for identifying the media zone in the media data stream, and inserting the identifier into the zone description.

3. The method according to claim 1, the method further comprising
determining at least one further element comprising at least one of:
further identification information for identifying the start, end, or duration of the media zone in the media data stream,
a play-out control instruction regarding the play-out of the media zone,
information for inserting media data into the media zone,
rights management information regarding the media zone, and
integrity protection information for protecting the integrity of at least one of the media zone and the zone description, or parts thereof, and
inserting the at least one further element into the zone description or a zone descriptor comprising the zone description.

4. The method according to claim 3, the method comprising determining the integrity protection information for protecting the integrity of the zone description.

5. The method according to claim 4, wherein determining the integrity protection information comprises performing a cryptographic signature over the zone description to obtain a signature value.

6. The method according to claim 5, wherein the cryptographic signature is performed using a cryptographic key delivered in an Entitlement Control Message (ECM) or a cryptographic key derived therefrom.

7. The method according to claim 6, wherein the cryptographic key is the key also used to protect content of the media data stream from unauthorized access.

8. The method according to claim 3, wherein the play-out control instruction conveys zone type information in accordance with the Marlin Dynamic Media Zones specification.

9. The method according to claim 1, the method further comprising
determining that at least one of said one or more program components is protected,
setting a zone indication parameter in accordance with the protection determination, and
associating the zone indication parameter with a data segment that prevents unauthorized play-out of at least one of said one or more program elements, said data segment being part of the media data stream.

10. The method according to claim 9, the method further comprising
performing an integrity protection of the zone indication parameter.

11. The method according to claim 9, wherein the data segment that prevents unauthorized play-out is an Entitlement Control Message (ECM).

12. The method according to claim 9, wherein the zone indication parameter is a zone information notification flag or a zone descriptor counter.

13. The method according to claim 1, the method further comprising triggering the definition of the program specific information data segment whenever an update of the zone description occurs.

14. The method according to claim 1, wherein the PMT is associated to an Entitlement Control Message (ECM) via a second PID.

15. The method according to claim 1, wherein the media zone is a media data stream segment that has at least one of the following special properties:
the media data stream segment may not be skipped; and
the media data stream must be played from the start to the end.

16. The method according to claim 1, wherein the media zone is a media zone in accordance with the Marlin Dynamic Media Zones specification.

17. A method for controlling play-out of a media data stream at a receiving device, the media data stream comprising one or more programs, each program comprising one or more program components, the method comprising
receiving the media data stream comprising a program specific information data segment, the program specific information data segment comprising data specifying information regarding at least one program of said one or more programs or at least one program component of said one or more program components in the media data stream, the program specific information data segment also having associated therewith a zone description defined for said at least one program or for said at least one program component, the zone description identifying a media zone for said at least one program or said at least one program component in the media data stream, wherein the media zone is a segment of the media data stream that has special properties, wherein the media data stream is a transport stream according to the Moving Pictures Expert Group-2 (MPEG-2) transport stream format,
detecting in the media data stream the program specific information data segment comprising the zone description, wherein the program specific information data segment is a Program Map Table (PMT) of the transport stream, wherein the zone description is included in a private table of the transport stream, and wherein the PMT is associated with the private table and the zone description included therein via a first Packet Identifier (PID), based upon an analysis of the zone description, identifying the media zone and determining a play-out control instruction for play-out of the media zone, and playing-out the identified media zone according to the determined play-out control instruction.

18. The method according to claim 17, wherein identifying the media zone comprises identifying the media zone from an identifier in the zone description.

19. The method according to claim 17, the method further comprising determining from the zone description at least one further element comprising at least one of:
further identification information for identifying the start, end, or duration of the media zone in the media data stream,
information for inserting media data into the media zone,
rights management information regarding the media zone, and
integrity protection information for protecting the integrity of at least one of the media zone and the zone description, or parts thereof, and performing, based on the determined further element, at least one of:
identifying start, end or duration of the media zone in the media data stream based on the further identification information,
determining media data that is in accordance with the information for inserting media data into the media zone and inserting said media data into the media zone,
determining rights management data and operations from the rights management information, and applying the determined rights management data and operations to the media zone, and
verifying the integrity protection information for verifying the integrity of at least one of the media zone and the zone description, or parts thereof.

20. The method according to claim 19, comprising determining the integrity protection information for protecting the integrity of the zone description.

21. The method according to claim 20, the method further comprising receiving an Entitlement Control Message (ECM).

22. The method of claim 21, wherein the ECM contains a cryptographic key, and wherein the integrity protection information is a signature value obtained by performing a cryptographic signature over the zone description using the cryptographic key.

23. The method according to claim 17, further comprising:
detecting in the media data stream a zone indication parameter associated with a data segment that prevents unauthorized play-out of at least one of said one or more programs or said one or more program elements, and
performing a security operation regarding at least one of said one or more programs, said one or more program elements, the media zone, and the zone description.

24. The method according to claim 23, the method further comprising
performing an integrity protection verification procedure of the zone indication parameter.

25. The method according to claim 23, wherein the data segment that prevents unauthorized play-out is an Entitlement Control Message (ECM).

26. The method according to claim 23, wherein the zone indication parameter is a zone information notification flag or a zone descriptor counter.

27. The method according to claim 26, wherein the data segment that prevents unauthorized play-out is an Entitlement Control Message (ECM), and wherein the method further comprises receiving the zone information notification flag in the ECM, the zone information notification flag signaling that the program specific information data segment contains a zone description.

28. The method according to claim 26, the method further comprising examining the program specific information data segment if the zone information notification flag is set.

29. The method according to claim 23, wherein the data segment that prevents unauthorized play-out is an Entitlement Control Message (ECM), and wherein the method further comprises:
performing an integrity protection verification procedure of the zone indication parameter,
determining from the zone description integrity protection information for protecting the integrity of at least one of the media zone and the zone description, or parts thereof, and
verifying the integrity protection information, for verifying the integrity of at least one of the media zone and the zone description, or parts thereof, based on a cryptographic key received in the ECM.

30. The method according to claim 29, wherein the cryptographic key is the key also used to protect content of the media data stream from unauthorized access.

31. The method according to claim 17, the method further comprising whenever an update of the program specific information data segment is detected, performing the detection of the program specific information data segment, the identification of the media zone, and the determination of the play-out control instruction.

32. The method according to claim 17, wherein the PMT is associated to an Entitlement Control Message (ECM) via a second PID.

33. The method according to claim 17, wherein the media zone is a media data stream segment that has at least one of the following special properties:
the media data stream segment may not be skipped; and
the media data stream segment must be played from the start to the end.

34. The method according to claim 17, wherein the media zone is a media zone in accordance with the Marlin Dynamic Media Zones specification.

35. A sending device for controlling play-out of a media data stream at a receiving device, the media data stream comprising one or more programs, each program comprising one or more program components, the sending device comprising
a processing circuit configured to:
define, for at least one program of said one or more programs or at least one program component of said one or more program components in the media data stream, a zone description that identifies a media zone for said at least one program or said at least one program component in the media data stream, wherein the media zone is a segment of the media data stream that has special properties, wherein the media data stream is a transport stream according to the Moving Pictures Expert Group-2 (MPEG-2) transport stream format, associate the zone description with a program specific information data segment, the program specific information data segment being a part of the media data stream and comprising data specifying information regarding said at least one program or said at least one program component, wherein the program specific information data segment is a Program Map Table (PMT) of the transport stream, wherein the zone description is included in a private table of the transport stream, and wherein the PMT is associated with the private table and the zone description included therein via a first Packet Identifier (PID), and a transmission circuit configured to transmit the media data stream towards the receiving device.

36. A receiving device for controlling play-out of a media data stream at the receiving device, the media data stream comprising one or more programs, each program comprising one or more program components, the receiving device comprising a receiver circuit configured to receive the media data stream comprising a program specific information data segment, the program specific information data segment comprising data specifying information regarding at least one program of said one or more programs or at least one program component of said one or more program components in the media data stream, the program specific information data segment also having associated therewith a zone description defined for said at least one program or for said at least one program component, the zone description identifying a media zone for said at least one program or said at least one program component in the media data stream, wherein the media zone is a segment of the media data stream that has special properties, wherein the media data stream is a transport stream according to the Moving Pictures Expert Group-2 (MPEG-2) transport stream format, a processing circuit configured to detect in the media data stream the program specific information data segment comprising the zone description and to identify, based upon an analysis of the zone description, the media zone and to determine a play-out control instruction for play-out of the media zone, wherein the program specific information data segment is a Program Map Table (PMT) of the transport stream, wherein the zone description is included in a private table of the transport stream, and wherein the PMT is associated with the private table and the zone description included therein via a first Packet Identifier (PID), and an output circuit configured to play-out the identified media zone according to the determined play-out control instruction.

* * * * *

UNITED STATES PATENT AND TRADEMARK OFFICE
CERTIFICATE OF CORRECTION

| | | |
|---|---|---|
| PATENT NO. | : 8,914,822 B2 | Page 1 of 1 |
| APPLICATION NO. | : 13/032888 | |
| DATED | : December 16, 2014 | |
| INVENTOR(S) | : Hartung et al. | |

It is certified that error appears in the above-identified patent and that said Letters Patent is hereby corrected as shown below:

Specification

In Column 3, Line 51, delete "my be" and insert -- may be --, therefor.

In Column 8, Line 16, delete "and".

In Column 8, Line 18, delete "segment;" and insert -- segment; and --, therefor.

In Column 9, Lines 38, delete "or and/or" and insert -- and/or --, therefor.

In Column 11, Line 11, delete "EMM pid" and insert -- EMM PID --, therefor.

In Column 11, Line 25, delete "MPEG$_2$" and insert -- MPEG2 --, therefor.

In Column 13, Line 46, delete "Simulcryp" and insert -- Simulcrypt --, therefor.

In Column 14, Line 5, delete "ands" and insert -- and --, therefor.

In Column 14, Line 17, delete "is know." and insert -- is known. --, therefor.

Signed and Sealed this
Seventeenth Day of May, 2016

Michelle K. Lee
*Director of the United States Patent and Trademark Office*